United States Patent [19]

Paelian et al.

[11] 3,754,610
[45] Aug. 28, 1973

[54] LOAD CELL
[75] Inventors: Owen Paelian; Richard L. Kellar, both of Huntsville, Ala.
[73] Assignee: Torrid Corporation, Huntsville, Ala.
[22] Filed: July 29, 1971
[21] Appl. No.: 167,104

[52] U.S. Cl. ............................................. 177/211
[51] Int. Cl. ............................................. G01g 3/14
[58] Field of Search .......................... 177/210, 211; 73/141 A

[56] References Cited
UNITED STATES PATENTS
3,554,025 1/1971 Anderson et al. ................. 177/211
2,597,751 5/1952 Ruge ................................ 73/141 A FOREIGN PATENTS OR APPLICATIONS
988,667 5/1951 France .......................... 73/141 A
1,156,671 12/1957 France .......................... 73/141 A Primary Examiner—Richard B. Wilkinson
Assistant Examiner—Stanley J. Witkowski
Attorney—C. A. Phillips

[57] ABSTRACT

This invention relates to load measurement devices of the type generally referred to as load cells in which the deformation of a material subjected to a stress is electrically measured, and particularly to a load cell in the form of a pin adapted to be employed in a clevis assembly to support a load to be measured.

15 Claims, 4 Drawing Figures

Patented Aug. 28, 1973
3,754,610
2 Sheets-Sheet 1
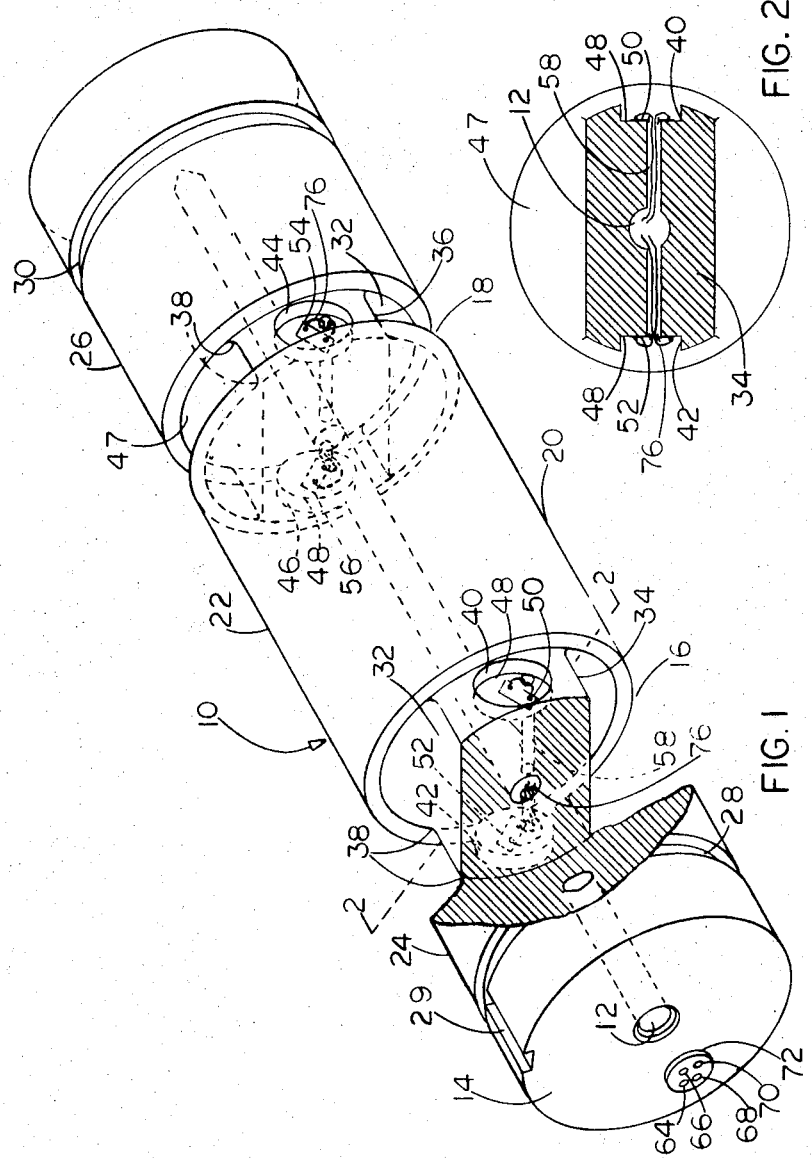

Patented Aug. 28, 1973 3,754,610

LOAD CELL

DESCRIPTION OF THE PRIOR ART

Conventional load cells are usually of a configuration requiring that they be bolted in circuit with the load to be weighed. While this form of interconnection is acceptable for many applications, in others it is not. For instance, there are instances in which the direction of loading may be subjected to change and thus some form of pivotal coupling of the load to a transducer must be employed. Further it is often desirable to be able to readily and quickly install a transducer, which suggests the use of a transducer other than a bolted on type. For this reason it has been previously suggested that load cells be constructed in the form of pins and that these be substituted for conventional pins used in clevis type couplers or assemblies. This, of course, enables quick and easy installation of load cells and considerable flexibility in the coupling of loads to load cells.

Accordingly there has occurred some development and manufacture of load cells in the form of a clevis pin. However, the restrictions imposed by the pin configuration have presented difficulties in obtaining the necessary accuracies. One of the difficulties appears to have been that such transducers have exhibited large and sometimes reverse hysteresis characteristics. In any event it has been found that the electrical output of these transducers have provided insufficient linearity to obtain the desired accuracies.

Accordingly it is an object of this invention to overcome the aforesaid difficulties and to provide a pin type load cell which meets required standards of accuracy and reliability.

SUMMARY OF THE INVENTION

These and other objects, features and advantages of this invention are accomplished by a load cell constructed in the form of an elongated pin of a material to accommodate and measure a given load or range of loads. The outer end region of the pins are adapted to couple to one side of a load and a center region of the pin is adapted to couple to the other side of the load. Shear sensing of the load is accomplished by positioning one or more strain sensitive elements in one or both of the loaded regions between the center and outer load coupling regions. The plane positioning of a strain sensitive element is such that the applied load is along a line parallel to the plane of the strain sensitive element. This line of direction is indicated by indexing means associated with one of the load coupling regions.

As one particular feature of the invention a strain sensitive element is affixed to plane, indented, outer surfaces of the loaded regions between load coupling regions and a passageway is cut through the pin from each plane surface to one end of the pin to facilitate the positioning of electrical leads connecting from the strain sensitive elements to an end of the pin. In this fashion the working or side surfaces of the pin are free from any obstruction of wires and yet the strain sensitive elements are positionable on a plane surface although the pin may be circular, which enables enhanced accuracy.

In one form of the invention the pins would be circular and thus adapted to be employed in a clevis assembly.

As still another feature of the invention two spaced peripheral grooves would be included in the outer surface of the pin, the grooves being in the loaded regions between the load coupling regions to provide high stress loaded regions where the strain sensitive elements are positioned. As still another feature of the invention two sector cuts are made in each of these grooves, on opposite sides of the pins, and with the plane of these sector cuts being perpendicular to the direction of force to be applied to the pin. The strain sensitive elements are then positioned in inner regions of the resulting rectangular cuts produced by the sector cuts. In use, the pin is coupled to one side of the load by gripping it in the center region and to the other side of the load by gripping it in the outer region of the pin.

BRIEF DESCRIPTION OF THE DRAWINGS

These and other objects, features and advantages of the invention will become more apparent from the following description when considered together with the drawings in which:

FIG. 1 is a perspective view, partly in section, of an embodiment of the invention.

FIG. 2 is a cross sectional view taken along the lines 2—2 of FIG. 1.

DESCRIPTION OF THE PREFERRED EMBODIMENT

Figure 4:
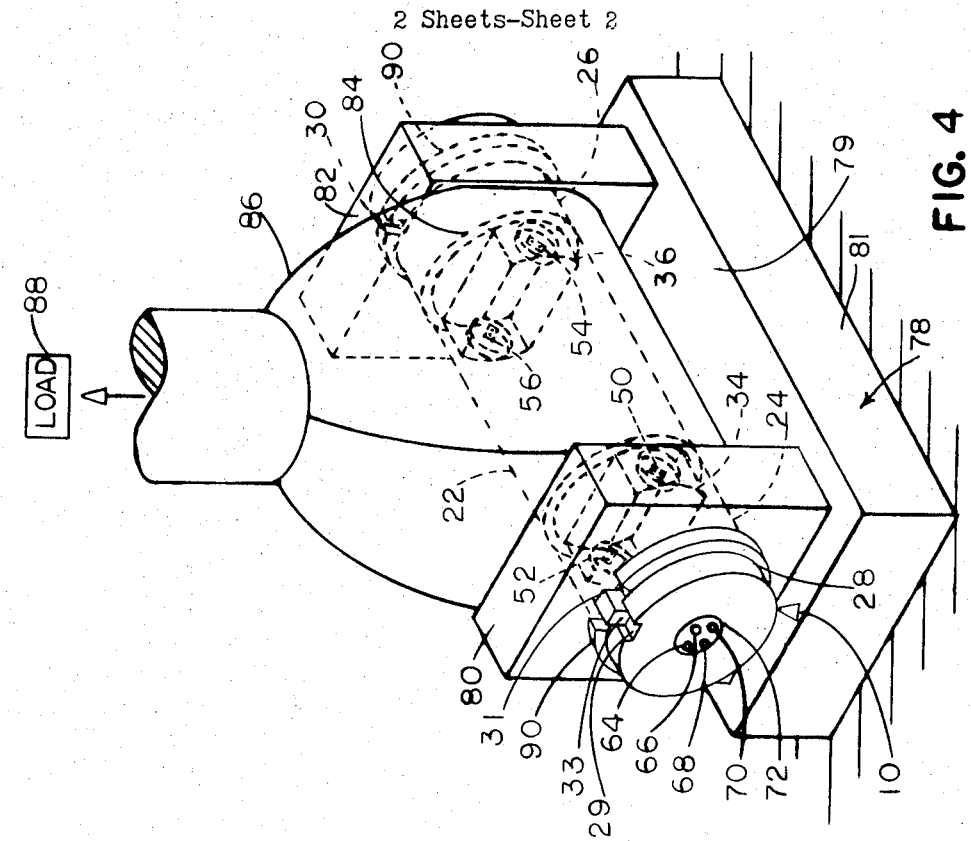
FIG. 4 illustrates a typical application of the invention when used in conjunction with a clevis assembly.

FIGS. 1 and 2 show a load indicating transducer pin 10 formed from an elongated section of rod selected for its mechanical properties and typically would be of steel. An axial recess 12 is drilled or formed in pin 10 and extends from end 14 substantially through the pin. Two intermediately positioned peripheral grooves 16 and 18 are formed in the outer surface 20 of pin 10 and are positioned between a center bearing region 22 adapted to be coupled to one side of a load, and two outer bearing support regions 24 and 26 adapted to be coupled to the opposite side of a load. Grooves 28 and 30 are formed at the outer edges of bearing regions 24 and 26 and are configured to accept locking or retaining rings for securing pin 10 to a structure with which it is to be used. A longitudinal groove 29 is cut into outer surface 20 of pin 10 and extends from end 14 to groove 28. Groove 29 is positioned so that it is centered about a plane through the axis of pin 10, and which plane includes the direction of a force to be measured. Two sector cuts 32 are made in each of peripheral grooves of 16 and 18, on opposite sides of pin 10, forming generally rectangular regions 34 and 36 interconnecting the center bearing support region and the outer bearing support regions. The radii 38 of the sector cuts 32 are selected within the range of one-tenth to one-half of the width of grooves 16 and 18. The depth of the sector cuts and depth of grooves are related in that generally rectangular regions 34 and 36 have a width approximately twice their depth while still having the proper cross sectional area for a desired sensitivity to load. Cavities 40 and 42 are formed in the center of the ends of rectangular region 34 and cavities 44 and 46 are located in the center of the ends of rectangular region 36. The bottom surfaces 48 of cavities 40, 42, 44 and 46 are plane and parallel, but perpendicular to the sides 47 of rectangular regions 34 and 36. Strain gauges 50, 52, 54 and 56 are affixed to the bottom surfaces 48 of cavities 40, 42, 44 and 46, respectively.

Figure 3:
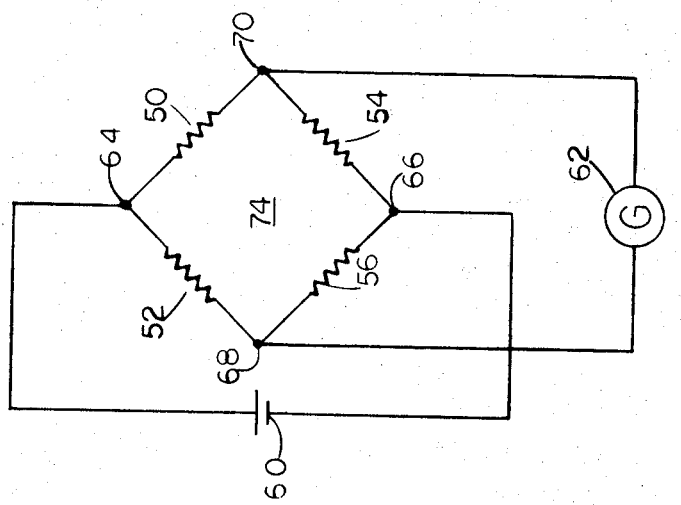
FIG. 3 is an electrical schematic diagram illustrating the electrical interconnection of components of the embodiment of the invention shown in FIG. 1.

Gauges 50 and 54 are typically parallel to one another, the important consideration being that oppositely positioned gauges of one rectangular region are positioned with their line of direction of maximum sensitivity oriented 90 degrees with respect to the other. Electrical leads 76 from strain gauges 50, 52, 54 and 56 are routed through apertures 58 connecting cavities 40, 42, 44 and 46 with axial cavity 12. These strain gauges are interconnected within cavity 12 in an electrical bridge configuration as shown in FIG. 3 and connections are made to external power source 60 and load indicator or galvanometer 62 through terminals 64, 66, 68 and 70 on connector plate 72. Connector plate 72 is affixed to end 14 of pin 10 to permit an atmospheric seal of the interior of cavity 12. Power source 60 is connected to terminals 64 and 66 of electrical bridge 74 and load indicator or galvanometer 62 is connected to terminals 68 and 70.

A typical installation employing pin 10 is shown in FIG. 4 wherein clevis 78 is secured in a stationary position. Pin 10 is inserted through clevis bearings 80 and 82 and through bearing 84 of load coupler 86, pin 10 being rotationally aligned with the plane surfaces of cavities 40, 42, 44 and 46 parallel to the direction of applied load 88. Locking rings 90 are installed in grooves 28 and 30 of pin 10 to secure pin 10 within the clevis assembly and prevent axial movement of the pin. Locking key 33 is inserted in groove 29 and is secured to clevis bearing 80 by means not shown, such as a screw. As load coupling is applied, stresses are concentrated within rectangular regions 34 and 36 which couple the load between center bearing region 22 and outer bearing regions 24 and 26. This results in shearing forces being applied which are detected by the deformation of strain gauges 50, 52, 54 and 56. Thus, for example, with clevis assembly 78 in tension, as shown, strain gauges 52 and 54 compress and their resistance is decreased, strain gauges 50 and 56 stretch and their resistance is increased. Thus the balance of bridge 74 is upset and voltage sensitive indicator 62, calibrated in terms of pounds, percent of maximum loading or other engineering units, reads out the magnitude of the applied load.

While in the illustration of FIG. 4 the applied load is in the form of tension, it is to be understood that compression type loads may be measured in the same manner. Clevis assembly 78 may be either in the form of a fixed mount, as shown, or in a form which is not so affixed, such as wherein the clevis assembly is in circuit with a flexible cable.

In accordance with this invention and wherein the gauge elements are positioned as described and on plane surfaces parallel to the direction in which the load is applied to the pin, there is provided a more accurate and reliable pin type load cell than has been previously available.

What is claimed is:

1. A load cell in the form of an elongated pin comprising:
    A. first and second outer end load coupling regions adapted to directly connect said pin to one side of a load applied perpendicularly to the longitudinal axis of said pin;
    B. a center load coupling region adapted to couple said pin to the other side of said applied load;
    C. first and second loaded regions of reduced cross section compared to the outer end load coupling regions and said center load coupling region, interconnecting, respectively, said first outer end load coupling region to said center load coupling region and said second outer end load coupling region to said center load coupling region; and
    D. at least one strain sensitive element generally lying within a plane within at least one of said loaded regions and wherein said plane is parallel to the line of direction of force to be measured by said load cell.

2. A load cell in the form of an elongated pin comprising:
    A. first and second outer end load coupling regions adapted to couple said pin to one side of an applied load;
    B. a center load coupling region adapted to couple said pin to the other side of said applied load;
    C. first and second loaded regions interconnecting, respectively, said first outer end load coupling region to said center load coupling region and said second outer end load coupling region to said center load coupling region;
    D. at least one strain sensitive element generally lying within a plane within at least one of said loaded regions and wherein said plane is parallel to the line of direction of force to be measured by said load cell; and
    E. wherein one of said load coupling regions includes indexing means indicating the line of direction of force to be measured by said load cell.

3. A load cell as set forth in claim 2 wherein there is included at least one plane outer surface on one of said loaded regions for supporting an adjacent and parallel positioned said strain sensitive element.

4. A load cell as set forth in claim 3 wherein a said plane outer surface is positioned below the surrounding outer surface of said loaded region and said elongated pin includes a passageway connecting between at least one end of said pin and a said plane outer surface whereby electrical leads may be connected from a said end of said pin to a said strain sensitive element.

5. A load cell as set forth in claim 4 wherein said loaded regions are of reduced cross section compared to the outer-end load coupling regions and said center load coupling region.

6. A load cell in the form of an elongated pin comprising:
    A. first and second outer end load coupling regions adapted to couple said pin to one side of an applied load;
    B. a center load coupling region adapted to couple said pin to the other side of said applied load;
    C. first and second rectangular regions of reduced cross section interconnecting, respectively, said first outer end load coupling region to said center load coupling region and said second outer end load coupling region to said center load coupling region; and
    D. at least one strain sensitive element generally lying within a plane within each said rectangular region and wherein a said plane is perpendicular to one of the outer surfaces of said rectangular regions.

7. A load cell as set forth in claim 6 wherein said strain sensitive elements are connected in a bridge configuration and further comprise a source of power connected to one set of opposite bridge terminals and a galvanometer connected across the remaining set of opposite bridge terminals.

8. A load cell as set forth in claim 6 further comprising first load coupling means connected to said outer load coupling regions and second load coupling means connected to said center load coupling region.

9. A load cell as set forth in claim 8 wherein said first load coupling means comprises a clevis and said second load coupling means comprises an eye shaped coupler.

10. A load cell as set forth in claim 6 wherein said pin is cylindrical.

11. A load cell as set forth in claim 10 wherein each said rectangular region is elongated and said strain sensitive elements are positioned in a plane perpendicular to elongated side surfaces of said rectangular regions.

12. A load cell as set forth in claim 10 wherein the lengths of said rectangular region are of shorter dimension than dimensions of the adjoining said load coupling regions.

13. A load cell as set forth in claim 6 wherein said strain sensitive elements are positioned and housed within cavities extending inward from the ends of said rectangular regions.

14. A load cell as set forth in claim 13 wherein strain sensitive elements are elongated and positioned with the line of maximum sensitivity of strain sensitive elements in opposite said cavities, of a said rectangular region, oriented 45° with respect to the axis of said pin and 90° with respect to each other.

15. A load cell as set forth in claim 13 wherein said pin includes an elongated, axial cavity extending from one end of said pin for substantially the length of said pin and wherein openings extend between said cavities housing said strain sensitive elements and said axial cavity and wherein electrical leads from said strain sensitive elements may be positioned to connect external circuitry to said strain sensitive elements.

* * * * *